(12) United States Patent
Lepage

(10) Patent No.: US 10,267,030 B1
(45) Date of Patent: Apr. 23, 2019

(54) BUILDING CONSTRUCTION METHOD

(71) Applicant: Robert Lepage, Albuquerque, NM (US)

(72) Inventor: Robert Lepage, Albuquerque, NM (US)

( * ) Notice: Subject to any disclaimer, the term of this patent is extended or adjusted under 35 U.S.C. 154(b) by 0 days.

(21) Appl. No.: 15/901,127

(22) Filed: Feb. 21, 2018

Related U.S. Application Data

(63) Continuation-in-part of application No. 15/831,234, filed on Dec. 4, 2017, now abandoned, which is a continuation-in-part of application No. 14/822,264, filed on Aug. 10, 2015, now Pat. No. 9,834,923.

(51) Int. Cl.
*E04B 1/18* (2006.01)
*E04B 2/56* (2006.01)
*E04B 1/343* (2006.01)
*E04B 1/76* (2006.01)

(52) U.S. Cl.
CPC ............ *E04B 1/18* (2013.01); *E04B 1/34331* (2013.01); *E04B 1/7654* (2013.01); *E04B 2/562* (2013.01)

(58) Field of Classification Search
CPC .......... E04B 1/7654; E04B 1/18; E04B 2/562; E04B 1/7604; E04B 2001/7679; E04B 1/34331
USPC ........... 52/404.1, 404.3, 480, 742.13, 745.09
See application file for complete search history.

(56) References Cited

U.S. PATENT DOCUMENTS

| | | | | |
|---|---|---|---|---|
| 4,471,591 A * | 9/1984 | Jamison | ................... | E04B 1/10 264/46.4 |
| 4,486,994 A * | 12/1984 | Fisher | ................... | E04B 1/6116 264/46.5 |
| 4,748,781 A * | 6/1988 | Wencley | ................. | E04C 2/386 156/79 |
| 5,425,908 A * | 6/1995 | Merser | ................... | B27G 11/00 156/78 |
| 5,655,350 A * | 8/1997 | Patton | ................... | E04B 1/7604 52/404.1 |
| 5,765,330 A * | 6/1998 | Richard | .................... | E04B 1/14 52/265 |
| 6,047,518 A * | 4/2000 | Lytle | ..................... | E04B 1/7604 156/78 |
| 6,128,884 A * | 10/2000 | Berdan, II | ............. | E04B 1/767 52/406.2 |
| 7,107,731 B2 * | 9/2006 | Record | ................... | E04C 2/288 52/284 |
| 7,316,099 B2 * | 1/2008 | Faulkner | .................. | E04D 1/34 52/408 |
| 8,161,703 B2 * | 4/2012 | Peeters | .................. | E04B 1/767 52/406.2 |
| 8,789,338 B2 * | 7/2014 | Kulprathipanja | ......... | E04B 2/02 52/483.1 |

(Continued)

*Primary Examiner* — Joshua K Ihezie
(74) *Attorney, Agent, or Firm* — Rod D. Baker

(57) ABSTRACT

A method of constructing a building using wall panel assemblies and roof panel assemblies that are made up of traditional framing materials, such as studs and interior walls, coated with insulating foam, except that the typical exterior sheathing is optional. Because the panel assembly is structurally sound and thermally insulated, the only reason to install an exterior sheath or additional roofing material is for aesthetic or practical purposes. A beneficial mode for readily applying insulating foam to provide for sealably joining roof panel assemblies to wall panel assemblies is disclosed.

12 Claims, 17 Drawing Sheets

(56) References Cited

U.S. PATENT DOCUMENTS

| | | | |
|---|---|---|---|
| 2001/0003993 A1* | 6/2001 | Faverio, IV | F16L 59/147 138/149 |
| 2007/0074474 A1* | 4/2007 | Jannelle | E04B 1/7604 52/309.4 |
| 2008/0302037 A1* | 12/2008 | Brown | E04B 5/12 52/289 |
| 2009/0217930 A1* | 9/2009 | Holley | E04B 1/166 128/205.26 |
| 2011/0209734 A1* | 9/2011 | Cannady | E04H 15/001 135/96 |
| 2014/0157710 A1* | 6/2014 | Potter | E04B 1/92 52/582.1 |

\* cited by examiner

BUILDING CONSTRUCTION METHOD

CROSS-REFERENCE TO RELATED APPLICATIONS

This application is a continuation-in-part of my co-pending U.S. Utility patent application Ser. No. 15/831,234, filed 4 Dec. 2017, which was a continuation-in-part of my U.S. Utility patent application Ser. No. 14/822,264, filed 10 Aug. 2015, now U.S. Pat. No. 9,834,923 entitled "Building Construction Method." Entirety of each of these prior applications is incorporated herein by reference.

BACKGROUND OF THE INVENTION

Field of the Invention

The present invention relates to building construction methods, particularly to a method and unit that provides energy efficiency and structural soundness in buildings through a foam layer shell application.

Background Art

"Light framing" construction is a known construction mode using many small and generally closely spaced members that are assembled by nailing/screwing, and the mode includes balloon, platform and light-steel framing. Light framing building techniques are commonly used, especially in the USA, to erect residential, small commercial or light industrial structures. Light-frame construction using standardized dimensional lumber has become the prevailing light construction method in North America. Use of relatively minimal structural material allows builders to enclose a large area with minimal cost, while achieving a wide variety of architectural styles.

In light platform framing, each floor is framed separately, each floor level being framed as a separate unit or platform. Freed from the need to use heavy timbers (e.g., as with a post-and-beam system), platform framing offers ease of construction. Builders first fabricate a floor, which consists of wood joists and subflooring. The floor often serves as a working platform on which the stud wall frames are fabricated in sections and then lifted into place. A second floor, or the roof, is constructed atop the first-floor wall frame sections. The roof is formed of rafters (e.g., sloping joists) or wood trusses. The standard interior wall sheathing is gypsum board (drywall), which provides fire-resistance, stability, and a surface ready for interior finishing. Light framed structures traditionally have been constructed individually at each construction site; today many of the framing elements are mass-produced elsewhere and assembled on-site.

Modern light-frame structures typically obtain strength from rigid panels (plywood and/or other plywood-like composites such as oriented strand board (OSB) used to form all or part of wall sections). Until recent years, builders often employed any of several types of diagonal bracing techniques to stabilize framed walls. Diagonal bracing remains a vital interior part of many roof systems, and in-wall wind braces are required by building codes in many municipalities or by individual state laws in the USA. Special framed shear walls also are sometimes required to promote building structural strength, especially to foster compliance with earthquake engineering and wind engineering codes and standards.

Thus, in commercial and residential construction, walls typically are framed up using vertical wooden or steel studs, to which an interior wall panel made of gypsum drywall (e.g., SHEETROCK® panel), fiberboard, traditional plaster, or the like is attached. Thereafter, exterior wall sheathing is used to enclose the wall and building and provide a surface for application of exterior finish materials, such as stucco, brick façade, shingles, aluminum or vinyl siding, etc. Insulating material, such as fiber glass, rock wool or cellulose, normally is sandwiched between the interior wall panel and exterior wall sheathing to thermally insulate the rooms and spaces of the building. Using this traditional method, there disadvantageously is little or no insulation present where the entire length of the vertical stud contacts the interior wall panel on one side, and exterior wall sheathing on the other side, providing a conduit for heat to readily escape the interior rooms, through the studs, to the outside environment.

The present invention solves this thermal insulation problem and requires significantly less materials to achieve a highly energy efficient and structurally sound building. The presently disclosed method and system offers advantages of structural strength (potentially compliant with many building codes respecting wind and earthquake resistance) using fewer materials and less labor-intensive methodology compared to fully conventional light framing construction. Less materials and ease of construction yields benefits of faster construction and reduced construction costs.

The present invention contemplates constructing a building using wall and ceiling panel assemblies that are made up of many traditional framing materials, but which are then coated with an insulating and strengthening foam. The foam layer initially is applied as viscous flowable foam, which may be sprayed in place. After controlled application, the foam layer then hardens into an enveloping shell which provides not only thermal insulation to the completed structure, but which also lends substantial structural strength. Moreover, because the foam shell substantially seals the interior of the structure against exterior weather, an exterior sheathing and an exterior façade are optional. A structure erected according to the present invention may be, if desired, substantially air tight and water tight (except where deliberately provided with doors, windows, vents, and the like). As the structure also is structurally sound and thermally insulated, the only reason to install an exterior sheath or additional roofing material is for aesthetic purposes.

While there are examples in the prior art of applied-foam insulating wall panels, none offer the advantages of the present invention.

SUMMARY OF THE INVENTION

The present invention is a unit and method of residential and commercial building construction. The construction unit is a structure comprised of closed cell polyurethane foam and portions of traditional light framing materials, such as studs, inner wallboard, roof trusses, and inner ceiling wall board. Standoffs are installed on a wall stud or roof truss that creates a gap between the stud/truss and the wall board which allows the foam to more completely coat the wall board. Once it is hardened, the wall board, standoff, stud/truss and foam become a structurally sound, highly insulated, building. The only purpose for the outside wall sheathing materials and roofing (e.g., shingles, tiles) are for aesthetic—not structural—reasons.

The building construction unit and method of the present invention includes arranging two or more (normally a substantial plurality) panel assembly units adjacent to each other to form the walls (using studs), ceilings (using trusses/rafters) and floors of a building. This erection and arranging of panel assemblies is performed mostly according to known light framing techniques, but once the light framing is realized, the interior panels (e.g., gypsum board are attached to the inside of the framed walls/roof. The framed walls and roofs need not be provided with conventional exterior coverings such as brick or siding. Insulation such as fiberglass batting or blown-in cellulose need not be sandwiched between interior panels and exterior sheathing. Rather, the framed structure, including the installed interior panels, is covered with insulating foam.

Each panel assembly preferably is made of a number of studs with standoffs spaced along one side of the stud and an interior panel. For instance, where a panel assembly is being used as a wall, a plurality of studs is installed in the upright position a certain distance apart (this distance being calculated to provide adequate structural support for the building), and the standoffs are attached the studs so that the standoffs are between the studs and an interior wall panel. This creates gaps or spaces between the studs and the wall panel where the standoffs are not located. When the insulating foam is applied, it will fill these spaces providing more insulation for the room that is defined by the panel assembly than would be provided by the traditional method of attaching the wall panel directly to the studs.

Not only does the insulating foam provide thermal insulation, it also provides structural support so that an exterior wall panel or sheathing is not required. In a traditional building, an external panel would be attached to the exterior side of the stud, or the opposite side from the standoffs. This exterior panel would cover the studs and foam so that they could not be seen from outside the building, providing additional structural support to the building. In the present invention however, these exterior walls are not required since this method of construction provides enough structural support. Therefore, the exterior walls of a building using this method could have the appearance of insulating foam and the protruding exterior sides of the wall studs. Because this may be unattractive, the user of this method may desire to cover the exterior of the building with some material, but that material would not need to provide any structural support. The material would be for aesthetics only, for instance, the material could be made of solar panels, fabric, wood planks, reflecting material, anything, or nothing.

A combination of the studs with standoffs attached can be pre-fabricated. Further, the stud/standoff combination can be used in conventional construction methods. While not providing the structural support offered by the preferred embodiment of the present invention, the stud/standoff combination can be used such that the exterior sheathing is attached to the studs rather than an interior wall panel. Insulating foam is then sprayed on the interior side of the exterior sheathing so that the foam covers the sheathing and fills the gaps created by the standoffs prior to the installment of the interior wall panel.

In the preferred embodiment of the invention, the insulating foam is a closed-cell spray polyurethane foam (SPF) and is sprayed on such that when hardened, the foam layer is between about 2.0 inches and about 5.0 inches thick, and more preferably approximately 2.5 inches thick on wall panels and approximately 4.0 inches thick on ceiling panels. Preferably, the SPF layer hardens to a medium density (preferably between approximately 1.5 lbs/ft$^3$ and approximately 4.0 lbs/ft$^3$, most preferably approximately 2.0 lbs/ft$^3$), and is closed-cell to provide structural strength. The SPF layer is applied to the arranged panel assemblies as continuously as practically possible, and so provides continuous coverage at the junction between panel assemblies. When panel assemblies are used as walls, the studs preferably are of 2×4 or 2×6 wood or steel construction. When panel assemblies are used as ceilings, the ceiling joists or roof trusses are of conventional design. A panel assembly preferably is constructed such that the space or gap between the exterior face of a panel (e.g., gypsum board) and the interior side of the stud is, preferably, a minimum of one-half inch, i.e., the depth of a standoff is at least 0.5 inch—although this dimension may vary depending upon particular design requirements.

In one embodiment, a first panel assembly defines a wall assembly comprising a plurality of vertically oriented studs, and vertically situated panel members such as drywall. In this embodiment, the second panel assembly defines a roof assembly comprising a plurality of horizontally oriented roof rafters or trusses, to which horizontal panels (e.g., drywall) are attached (i.e., to provide a ceiling). The first and second panel assemblies are joined, typically in mutual perpendicularity, to provide a wall and roof for a building constituted of multiple wall and roof panel assemblies.

According to a preferred embodiment, a narrow horizontal top plate is situated along the top ends of the studs. The top plate is "narrow" in the sense that its width (in the dimension of the thickness of the wall) is less than the width of the studs. For example, if the wall studs are 2×6 inches, the top plate is composed of 2×4 inches lumber elements. The roof assemblies are supported upon the top plates; preferably, there is at least one separation saddle element between the bottom surface and of the roof assembly and the top surface of the top plate. The use of narrow top plates along the tops of the walls promotes easy and thorough application of closed-cell spray foam at and over the junctures where adjacent panels come in mutual contact where rood panel assemblies are joined to wall panel assemblies.

BRIEF DESCRIPTION OF THE DRAWINGS

The accompanying drawings, which are incorporated into and form a part of the specification, illustrate several embodiments of the present invention and, together with the description, explain the principles of the invention. The drawings are only for illustrating selected embodiments of the invention, and are not to be construed as limiting the invention. Further, all dimensions or proportions seen in the drawings are exemplary and not limiting of the scope of the invention. In the drawings.

Like label numerals are used to denote like or similar elements throughout the various views.

DESCRIPTION OF PREFERRED EMBODIMENTS

There is disclosed hereafter a method for erecting a structure, and a construction unit erected thereby. Initial steps of erection may be similar to known techniques, including for example the provision of foundation components such as reinforced poured concrete footings and/or stem walls. The method and structure of the inventive method also may be practiced upon conventional concrete masonry unit (CMU) substructures. This building construction method thus is not contemplated for use to erect a portable structure; rather, the invention is for erecting a building upon a permanent foundation. Conventional subflooring may be installed generally according to known techniques, including the pouring of concrete slab-on-grade, and/or the installation of truss-supported subflooring upon supporting substructure. The present invention exploits and then improves upon basic processes borrowed from light framing construction.

As used herein, certain terms have the following definitions: A "stud" is a metal or wood post used in the framework of a structure for supporting interior wall panels such as wallboard or similar material. A stud also provides structural support for a ceiling panel or roof top in the form of a ceiling joist, rafter, roof truss, or the like. A "panel assembly" is a portion of the building construction unit, namely, a plurality of studs (or trusses), and standoffs, and a panel attached to the studs (or trusses), as shown generally in FIG. 7.

Where the subscript "n" is used, "n" equals a positive integer and refers to the "nth" element of the apparatus and system that includes a plurality of such elements of indefinite number "n," (e.g., "nth" wall panel assembly in a construction unit having a plurality of panel assemblies).

The disclosed method, and a construction unit according thereto, is intended to provide an airtight envelope that surrounds the habitable spaces within residential structures and/or temperature and environmentally controlled portions of commercial structures, including high rise buildings. The airtight characteristic of the envelope is subject mainly to deliberate apertures and openings in the envelope, such as doors, vents, stacks, windows, and the like, which may be disposed through/in the envelope.

Figure 1:
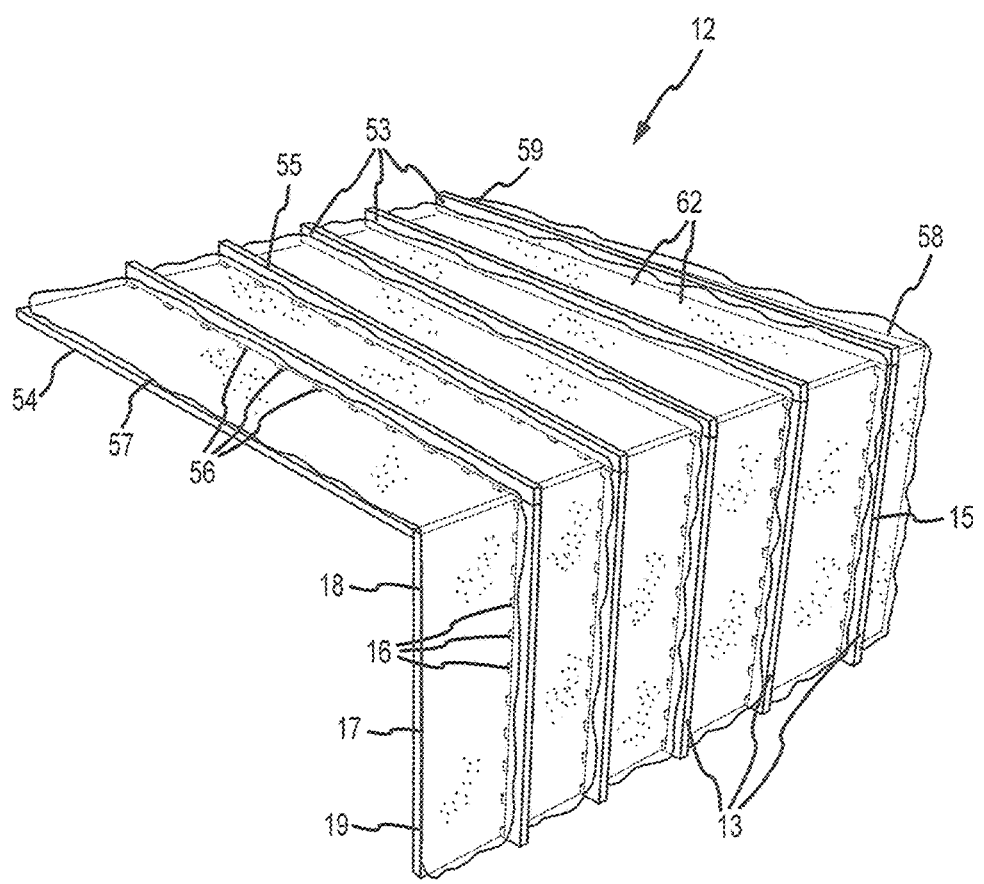
FIG. 1 is a perspective view of a portion of a building construction unit erected according to the present invention.
Figure 4:
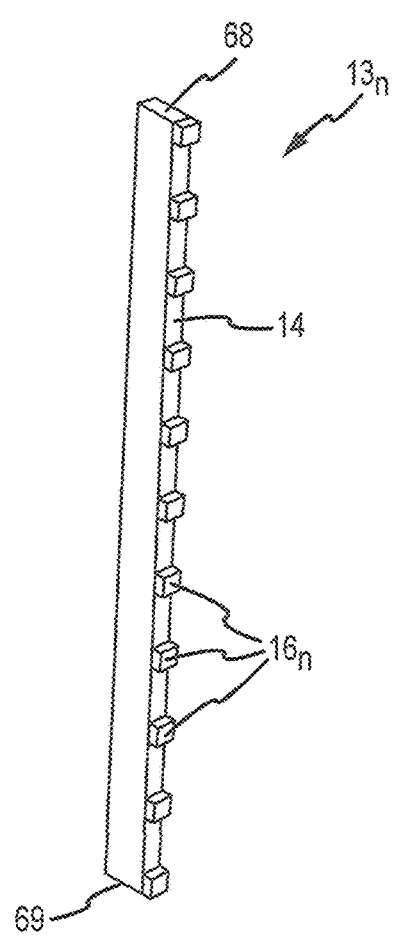
FIG. 4 is a perspective view of the interior side of the stud with standoffs.
Figure 7:
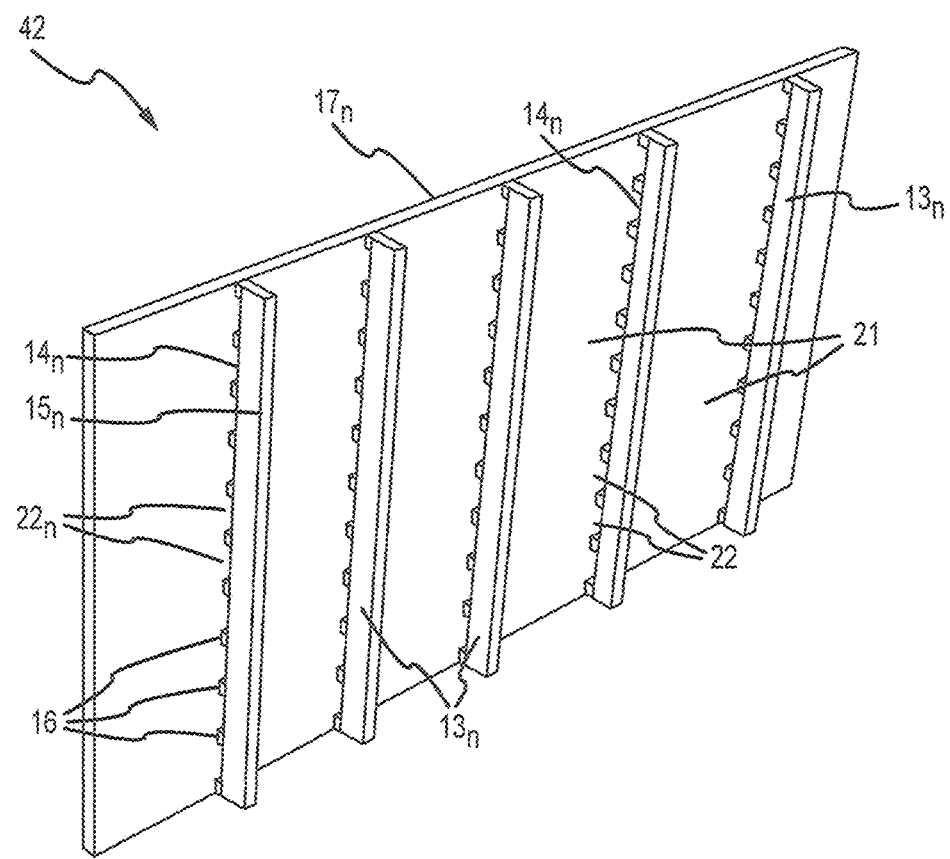
FIG. 7 is a perspective view of a representative panel assembly according to the present invention, the exterior face of a panel being visible, with standoffs defining spaces between the panel and the interior sides of the studs.

Reference first is made to FIGS. 1, 4, and 7, showing an example portion of a building construction unit 12 (FIG. 1) and a simple panel assembly 42 (FIG. 7) erected according to an embodiment of the present invention. There is provided a plurality of first studs 13, $13_n$ which in a preferred embodiment are disposed substantially vertically. Each of such first studs has an interior side 14, $14_n$ (FIGS. 4, 7) and an exterior side 15, $15_n$ (also shown in FIG. 7). The studs 13, $13_n$ may be composed of metal or preferably wood, generally according to conventional light frame construction.

A plurality of first standoffs 16, $16_n$ are attached (e.g., with adhesive or nails) to the interior side 14 of each first stud 13. The first standoffs 16 may be composed of wood, plastic, or composite, but preferably constitute a generally rigid yet thermally insulating material. Each panel assembly according to this disclosure includes a panel, and panel assembly 42 features first panel 17. The panels of panel assemblies, including the first panel 17, have a first (e.g., upper) end 18, and second (e.g., lower) end 19, an interior face 20 (see FIGS. 1, 2) and an exterior face 21. The exterior face 21 of the first panel 17 is attached to the first standoffs 16 to define spaces 22 between the exterior face 21 of the first panel 17 and the interior side 14 of the first studs 13.

Figure 2:
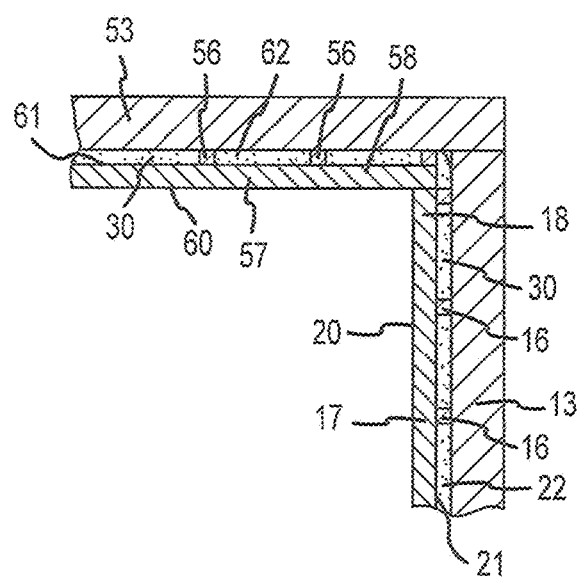
FIG. 2 is an enlarged cross-sectional side-view of a portion of a building construction unit according to the present invention, taken near a juncture of a first panel abutting adjacent to a portion of a second panel where any two panel assemblies adjoin one another.

Combined reference is made to FIGS. 1 and 2. For illustrative purposes in FIGS. 1 and 2, the first panel assembly is shown in the vertical plane and the second panel assembly is shown in the horizontal plane, the first panel assembly being attached at a right angle to the second assembly. Despite this illustrative representation, any number of panel assemblies, connected or arranged at any of various angles (but most typically orthogonally), are contemplated and their arrangement in various constructive configurations is within the capability of a person skilled in the art.

FIG. 2 is a vertical cross section of portions of adjoining first (e.g. vertical) and second (e.g., horizontal) panel assemblies, in the vicinity where they come together, showing single first stud 13 and single second stud (or roof truss) 53. There thus also are provided a plurality of second roof rafters or studs 53, the second studs 53 having an interior side 54 and an exterior side 55. The second studs are similar in general configuration to first studs 13, but may serve as beams/joists/trusses, and thus more preferably and likely have larger moments of inertia, or are integrated as the bottom chord in a truss (see stud $53_n$ in FIG. 9). The second studs 53 thus may be disposed substantially horizontally (i.e. in a roof truss) and may be, or be a part of, a roof joist system. A plurality of second standoffs 56 are attached to the interior side 54 of each second stud 53 of the plurality of second studs, similarly as described and shown for the first studs 13.

FIGS. 1 and 2 also illustrate that a second panel 57 (like panel 17, such as a gypsum board) is arranged adjacent to the first panel 17. The second panel 57 has a first end 58, a second end 59, an interior face 60 and an exterior face 61. The exterior face 61 of the second panel 57 is attached to the second standoffs 56 to define spaces 62 between the exterior face 61 of the second panel 57 and the interior side 54 of the second studs 53. A first end 58 of the second panel 57 preferably is in contact with a portion of an upper edge of the first panel 17. A layer of insulating foam 30 is applied to cover the exterior face 61 of the second panel 57 and the exterior face 21 of the first panel 17, filling the spaces 22 defined between the exterior face 21 of the first panel 17 and the interior side 14 side of the first studs 13, also filling the spaces 62 defined between the exterior face 61 of the second panel 57 and the interior side 54 of the second studs 53. The foam layer 30 thus contacts and adheres to both the exterior faces 21, 61, as well as to the interior sides 14, 54 of the studs to constitute a shell-like layer incorporating the studs.

FIG. 2 offers an enlarged, cross-sectional, diagrammatic view of the connection of a first panel assembly (including first studs 13, first standoffs 16, first panel 17, and first spaces 22), with a second panel assembly (including second studs 53, second standoffs 56, second panel 57, and second spaces 62), with the layer of insulating foam 30 also shown. This corner connection is at the joist band area of a framed construction, where the ends of roof joists (e.g., second studs 53) rest atop the top plate (not shown for sake of simplicity of illustration) that typically runs horizontally along the top ends of vertical wall studs (e.g., first studs 13).

Figure 3:
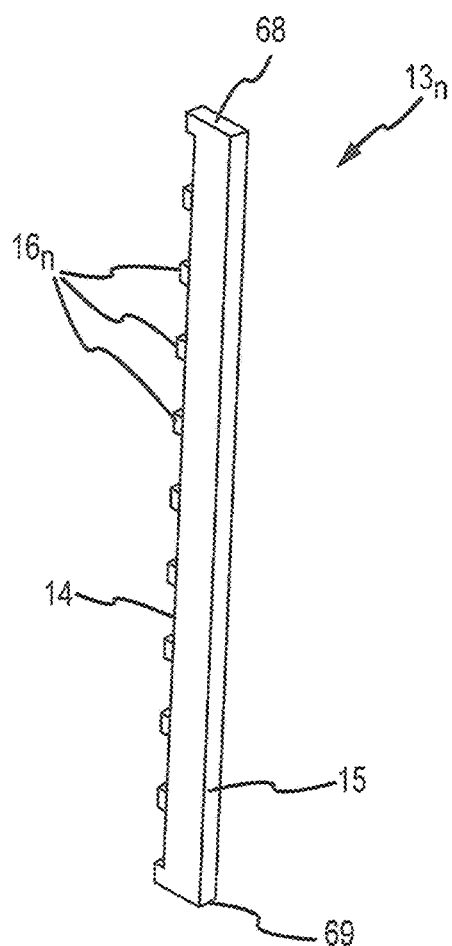
FIG. 3 is a perspective view of the exterior side of a single stud with standoffs, according to the present invention.
Figure 5:
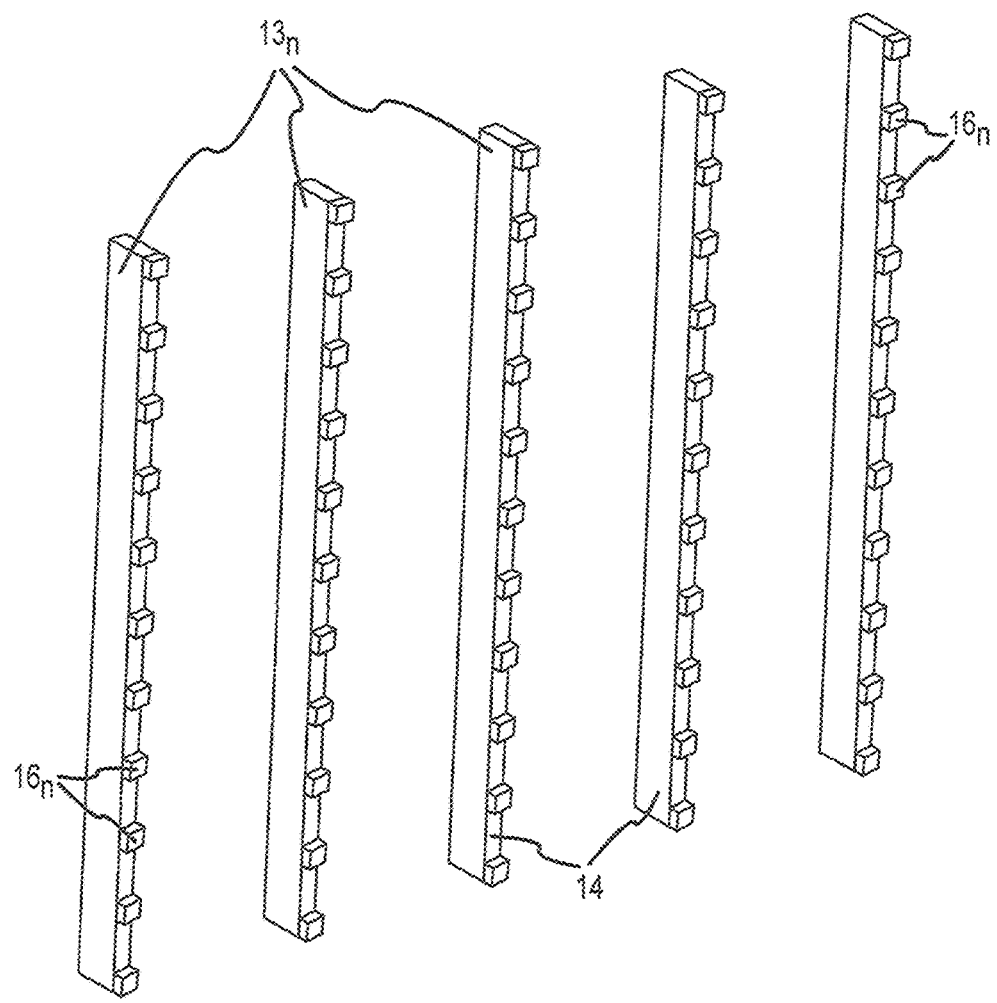
FIG. 5 is a perspective view of a plurality of studs according to the present invention, showing the standoffs on interior sides of the studs.
Figure 6:
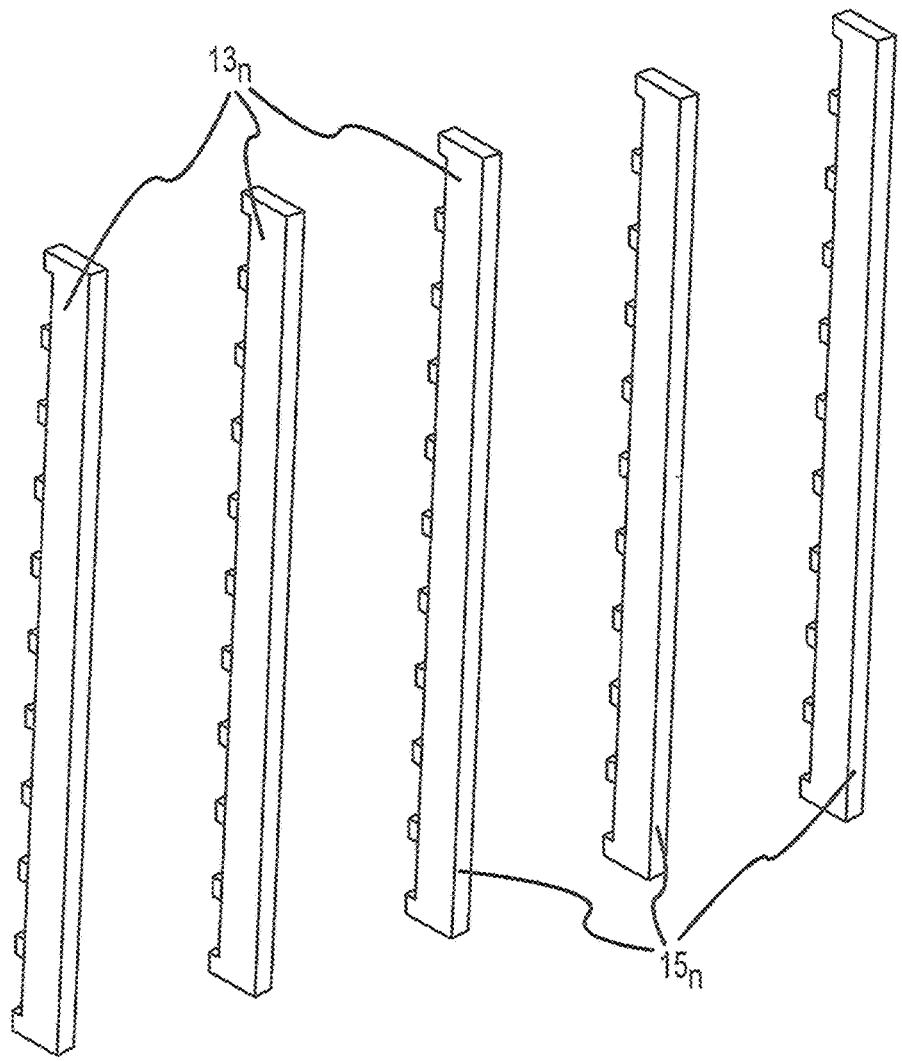
FIG. 6 is a perspective view of a plurality of studs, showing the exterior sides of the studs.

FIG. 3 illustrates that multiple standoffs $16_n$ preferably are attached to the interior side 14 of a representative single first stud $13_n$, where n equals a positive integer and refers also to the nth element in a multiplicity of studs usable in a building construction unit according to this disclosure; description of a single stud serves substantially to describe a plurality of similar studs. The exterior side 15 is the side to which a first panel 17 is affixed. FIG. 4 shows the single first stud $13_n$ with standoffs $16_n$ attached the stud's interior side 14. The standoffs may be composed of polymers, wood, high density expanded polystyrene, or a wood-polymer composite. Each first stud $13_n$ has a top end 68 that ordinarily connects to a top plate (not shown, but generally according to light framing convention), and a bottom end 69 that connects to a toe plate (not shown, but also generally according to convention). FIG. 5 illustrates that there is a plurality of the single first studs $13_n$ (with standoffs $16_n$ on the studs' interior sides $14_n$) while FIG. 6 is a view of the plurality of studs $13_n$ with standoffs $16_n$ extending from the studs' exterior sides $15_n$. Each panel assembly (e.g. assembly 42 in FIG. 7) includes a plurality of spaced studs $13_n$.

Specific reference is made to FIG. 7, which depicts a representative panel assembly 42 according to the present disclosure. A plurality of panel assemblies is interconnected and juxtaposed as walls and roofs to erect a construction unit (e.g., unit 12 of FIG. 1) having two or more walls and a roof. Doors and windows can be defined as desired in any given panel assembly. Any particular panel assembly 42 preferably includes a panel $17_n$, with the exterior face 21 of the panel attached to standoffs 16, which standoffs are in turn attached to the interior sides 14 of a plurality of studs $13_n$. Space $22_n$ is defined in one direction between adjacent standoffs, and (in a second direction) between the exterior face 21 of the panel $17_n$ and the interior side $14_n$ of the studs $13_n$.

Figure 8:
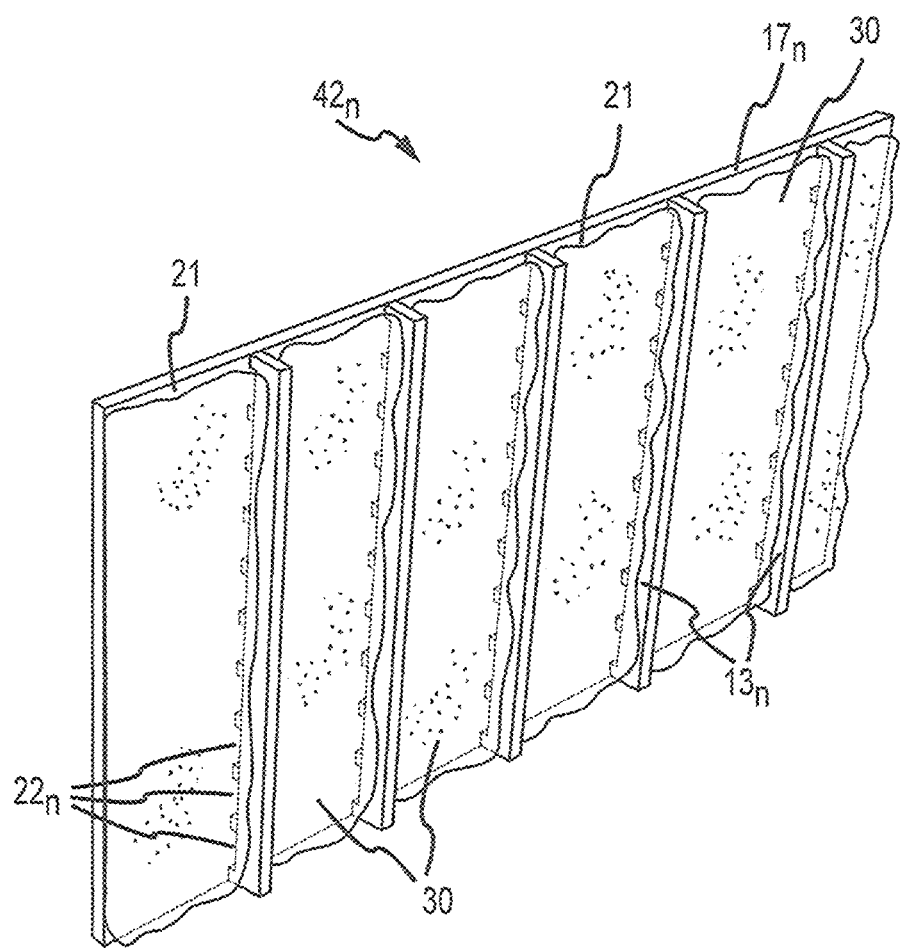
FIG. 8 is a perspective view of the representative panel assembly seen in FIG. 7, after a layer of insulating foam has been applied to the exterior face of the panel and filling the spaces defined by the standoffs and between the interior sides of first studs and the exterior face of the panel.

Attention is invited to FIG. 8, showing the representative panel assembly $42_n$ seen in FIG. 7, but after the application of a layer of insulating foam 30 to cover the exterior face $21_n$ of a panel $17_n$ and also to fill the spaces $22_n$ defined between the exterior face $21_n$ of the panel $17_n$ and the interior sides $14_n$ of the studs $13_n$. The foam layer 30 preferably is polymer foam (e.g., an aromatic isocyanate) that is applied by spraying. The layer 30 preferably is sprayed into place (using known spray application systems) as viscous foam, but cures to a hard layer of medium density (e.g., approximately two pounds per cubic foot). FIG. 8 also indicates that the foam layer 30 contacts and adheres to the lateral sides of the studs $13_n$, as well as to the interior sides of the studs. There accordingly is defined a structural shell that includes a structural integration of the studs $13_n$ with a panel $17_n$, with the standoffs and spaces $22_n$ enhancing thermal insulation between the studs and panel without compromising structural integrity. The polymer foam preferably is applied so to compile a layer that cures substantially integrally, preferably to define a layer 30 that is generally continuous over the exterior face 21 of a single panel assembly (but between the studs $13_n$), as well as wrapping around the junctures (near/along wall corner stanchions, and near/along wall top plates) between adjacently juxtaposed panel assemblies.

A person skilled in the art recognizes that the mutual orientation of the studs and panel can be substantially reversed, that is, to turn the arrangement "inside out" with the studs on the inside of the construction unit and the panel on the outside. In such an alternative embodiment, the interior face of a panel faces outward with respect to the interior of the construction unit, and the spaces are defined by the spacers between the panel and the studs, whose interior sides also face inward toward the enclosed space of the structure. Thus, the representative panel assembly $42_n$ seen in FIG. 7, is merely flipped, and the layer of insulating foam is applied to cover the exterior face $21_n$ of the panel $17_n$ (but now facing the opposite direction) also to fill the spaces $22_n$ defined between the exterior face $21_n$ of the panel $17_n$ and the interior sides $14_n$ of the studs $13_n$.

Figure 9:
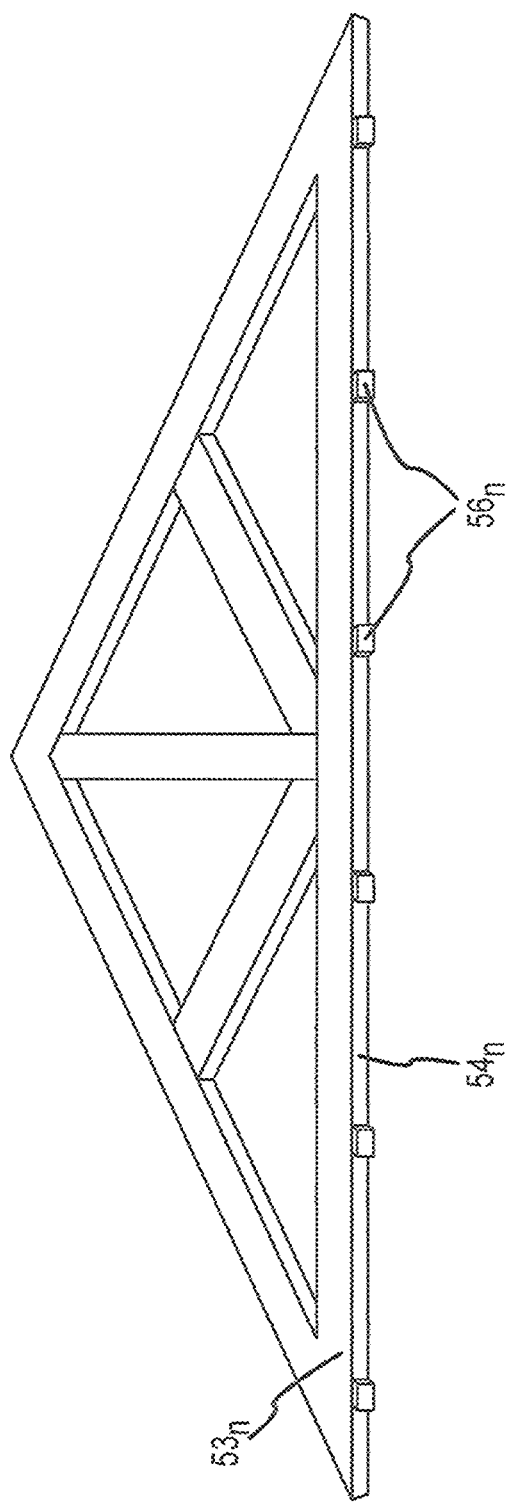
FIG. 9 is a perspective view of a second stud in the form of, or included within, a roof truss.
Figure 10:
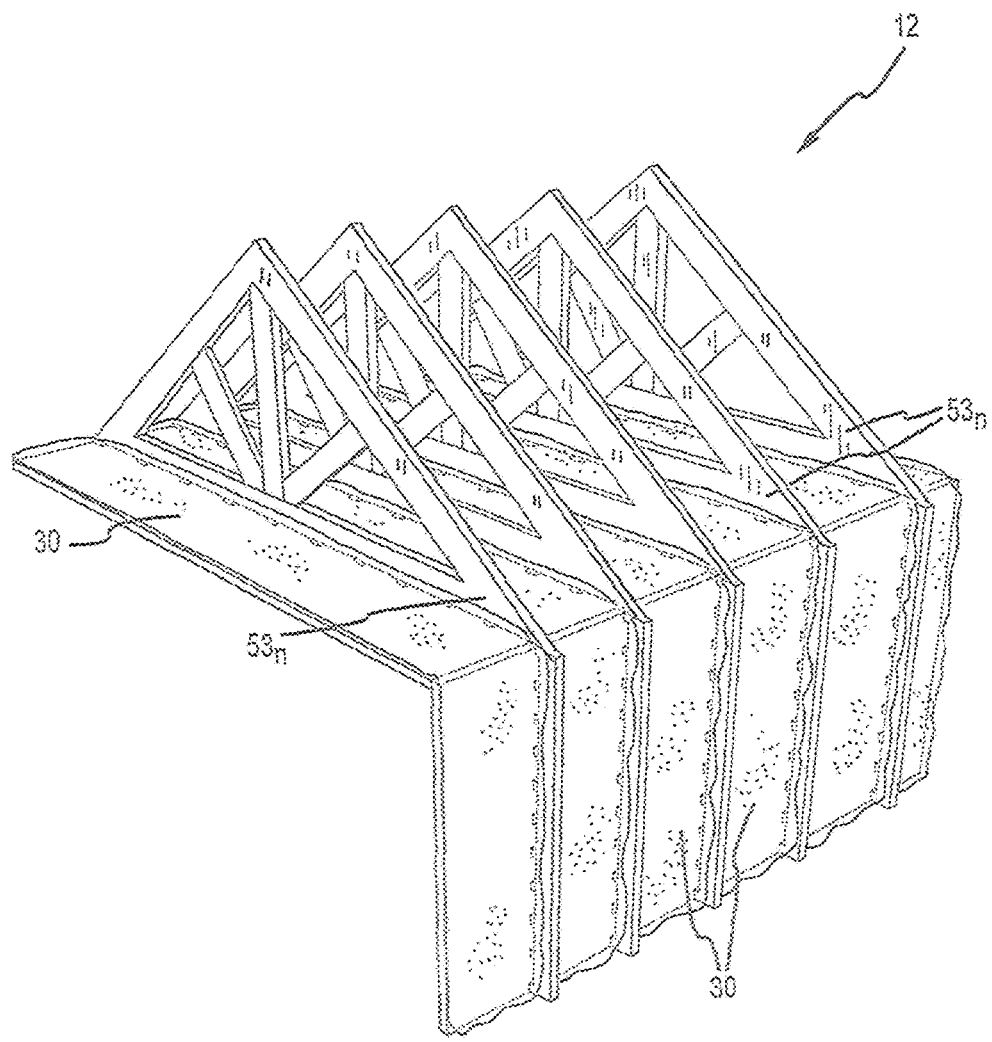
FIG. 10 is a perspective view of the building construction unit according to the present invention, in which second studs are in the form of roof trusses.

FIG. 9 depicts a single second stud $53_n$ in the form of, or being a chord of, a roof truss, with multiple second standoffs $56_n$ attached to the interior side $54_n$ of the second or roof truss stud $53_n$. FIG. 9 is best considered in combination with FIG. 10, illustrating a building construction unit 12 according to this disclosure and as suggested by FIG. 1. The construction unit 12 of FIG. 10 is shown covered with the foam layer 30 and having second studs 53 arranged the form of a roof truss.

Figure 11:
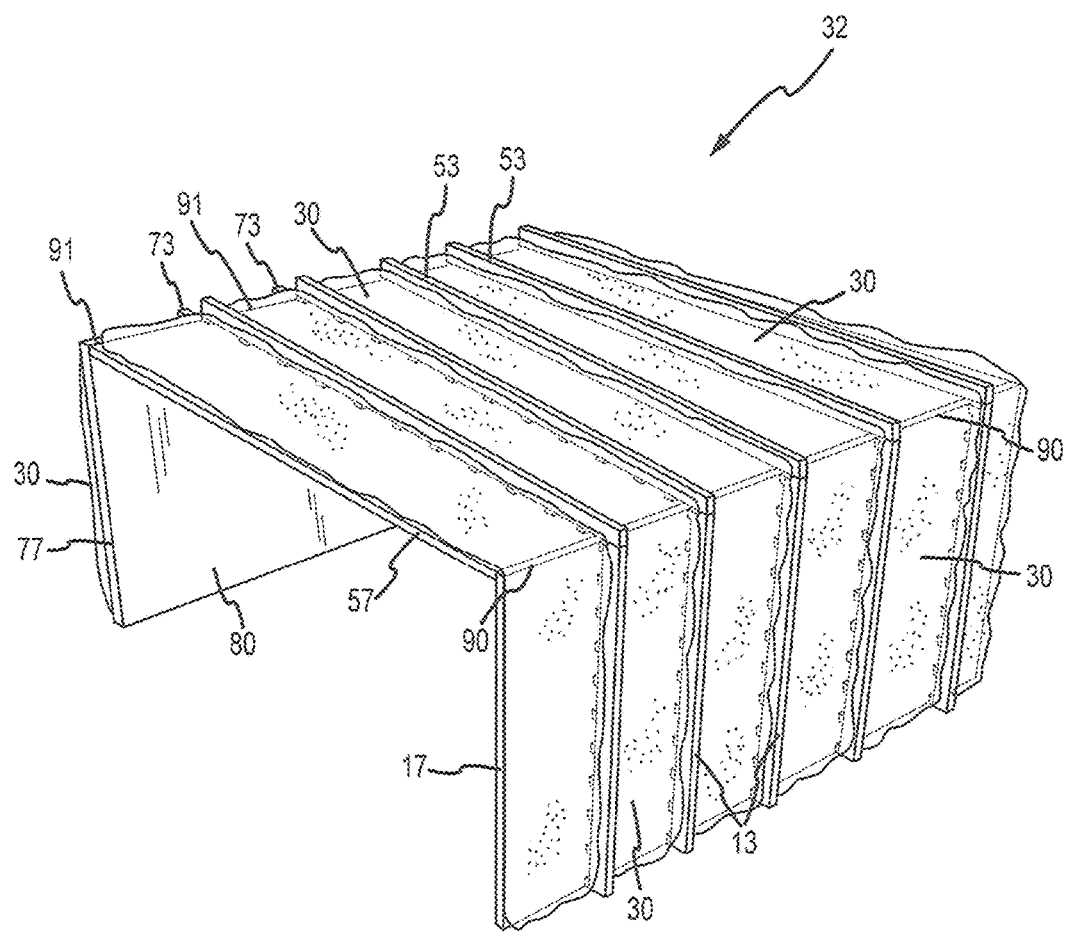
FIG. 11 is a perspective view of a portion of a self-supporting building construction unit according to the present invention, in which a vertical third panel assembly is provided parallel to a vertical first panel assembly and with a second panel assembly disposed horizontally and perpendicularly between the first and third panel assemblies.

Taking reference to FIG. 11, it is seen that an example self-supporting building construction unit 32 according to this disclosure features a unit similar to the unit 12 of FIG. 1. The construction unit 32 provides a third panel assembly disposed, for example, as a wall parallel to the first (wall) panel assembly and perpendicular to the second (roof) panel assembly. However, it is to be understood that a third panel assembly could be disposed or arranged orthogonally with respect to the first and second panel assemblies, i.e., to "close" the open end of the structure of FIG. 11, with all three panel assemblies mutually perpendicular in three dimensions to define a 3-D corner. A foam layer 30 is in such a case applied to substantially integrate, into a structural shell, all three juxtaposed panel assemblies.

The third panel assembly includes a plurality of third studs 73, each of the third studs 73 having an interior side and an exterior side, a plurality of third standoffs attached to the interior side of each third stud 73, generally in accordance with those elements and features as described hereinabove for first plurality of studs 13 and second plurality of studs 53, as well as the first and second panels 17, 57. Likewise, a third panel 77 is provided, the third panel 77 having a first upper end, a second lower end, an interior face 80 and an exterior face, the exterior face being attached to the third standoffs in a manner like unto that previous described above for the first and second panels. There also are side or lateral end edges to the third panel. Spaces are defined between the exterior face of the third panel 77 and the interior side of the third studs 73. The first or upper end of the third panel 77 is adjacent to, preferably abuts, at least a portion of the second end 59 of the second panel 57 (see also FIG. 1).

And again, as seen in FIG. 11 a layer of insulating foam 30 is provided on the exterior face of the third panel 77, the layer 30 substantially covering the exterior face of the third panel 77, and filling the spaces defined between the exterior face of the third panel 77 and the interior sides of the third studs 83. FIG. 11 thus depicts three of the representative panel assemblies 42 of FIG. 7 arranged as two parallel walls and a roof. There is a substantially continuous layer of insulating foam 30, the layer 30 covering the exterior faces of all the panels, and filling the spaces defined between the exterior faces of the panels and the interior sides of all the studs, and bonding together the studs and panels.

It accordingly is understood that, although not depicted, according to the disclosed method two panel assemblies 42 may have their respective side ends placed together and with the planes of the panels disposed to define an angle (typically 90 degrees) between them, so to define two walls of a construction unit. The side ends of the panel assemblies may be connected structurally at a corner stanchion according to known principles of light framing. However, the respective side edges of the panels (e.g., a pair of panels 17) of the respective panel assemblies preferably are adjacent, preferably abutted together, to define a vertical juncture that can be covered with an applied foam layer 30.

A construction unit 32 according to the present disclosure can be self-supporting, even with only the three panel assemblies depicted in FIG. 11, due to the structural integrity and enhancement provided by the cured foam layer 30—potentially even in the absence of diagonal bracing within the walls and at the corners of two walls, as commonly required in the art. The foam layer 30 adheres securely to all the panels and all or substantially all the studs and, when cured, with the studs and panels defines a generally integrated thermally insulating shell or envelope of the construction unit.

Still referring to FIG. 11, it is noted that there is a first juncture 90 defining the corner (generally near the joist band) whereat the first panel 17 and the second panel 57 come substantially adjacently together or in actual abutment. Similarly, the construction unit 32 of FIG. 11 has a second juncture 91 (near the joist band) along a corner defined where the second panel assembly 57 and the third panel assembly 77 preferably abut adjacently together. Referring also to FIG. 2, and as described further hereinafter, a construction unit 32 according to the present disclosure has the advantageous feature that the layer of insulating foam 30 is applied to wrap continuously over the outside of the junctures 90, 91, to cover that juncture and all other junctures similarly defined between other panels throughout a construction unit. The insulating layer 30 is applied substantially continuously between the first studs 13, and between the second studs 53, and between the third studs 73 as well as over the junctures 90, 91 running perpendicular to the studs. As mentioned, the insulating foam 30 also is applied so to fill all the spaces (provided by the use of the standoffs, e.g., 16, 56) defined between the exterior faces (e.g., 21, 61) of the several panels (e.g., 17, 57, 77) and the interior sides (e.g., 14, 54) of the studs 13, 53, 73. When a plurality of panel assemblies are joined to erect a construction unit (typically to enclose a hollow interior habitation special volume), the application of the insulating foam layer 30 thereby constitutes a mostly continuous, unbroken (i.e., accounting yet for doors, windows, and other intended structural and functional openings) envelope which seals the interior of the structure from significant penetration by weather, including moisture and air.

It is readily understood by a person skilled in the art that fourth and fifth panel assemblies (substantially the same as those described) could be arranged with and against the first three panel assemblies seen in FIG. 11, to close the open ends of the structure, and thereby to compose a five-sided construction unit enclosing an open hollow interior, the overall construction unit defining a generally parallelepiped shape. All the junctures (including, e.g., junctures 90, 91) at the abutments of adjacent panels of adjoining panel assemblies preferably are covered with the layer of foam 30. The layer 30 thus is essentially seamless where adjacent panel assemblies come together (i.e., at and along wall corner stanchions where to wall panel assemblies are connected, and along joist bands at the top plates where wall panel assemblies connect to a roof panel assembly.

Figure 12A:
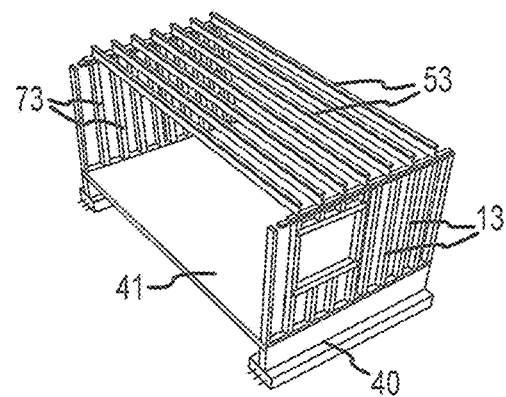
FIGS. 12A-D are perspective views of a construction unit as it appears at successive stages of erection according to the present invention.

FIGS. 12A through 12D serve to illustrate further a method of erecting a construction unit structure in accordance with the present disclosure. It is noted that some initial steps of the method are similar to erecting a structure according to known light framing construction techniques, such as conventional frame-on-slab construction. Known techniques may be adapted to accommodate the more specific disclosure of the inventive method as described herein. There is installed a foundation generally according to convention, which may be footings with stem walls 40 (e.g. reinforced concrete) as shown in FIG. 12A. A concrete slab 41 or other floor is provided. FIG. 12A shows that first studs 13 are provided, the first studs each having an interior side and an exterior side (FIGS. 3 and 4), and may be provided vertically to define partially a wall. The first studs 13 with other framing elements may, according to convention, define window/doors, as suggested in FIG. 12A. First standoffs (FIGS. 5 and 6) are attached to the interior sides of the first studs 13. Second studs 53 also are provided, the second studs likewise each having an interior side and an exterior side. In FIG. 12A the second studs 53 are disposed horizontally to define partially a roof, and optionally may be part of a roof trussing system (FIGS. 9, 10). Second standoffs (FIG. 9) are attached to the interior sides of the second studs 53. FIG. 12A also shows that third studs 73 are provided, the third studs each having an interior side and an exterior side (FIGS. 3 and 4); the third studs 73 may be provided vertically to define partially a wall. Third standoffs (FIGS. 5 and 6) are attached to the interior sides of the third studs 13.

Figure 12B:
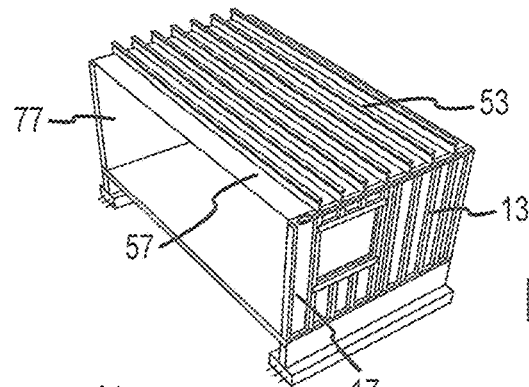

FIG. 12B shows that a first panel 17 is provided, the first panel having a first end, a second end, an interior face and an exterior face. The second panel 57 also is provided, the second panel having a first end, a second end, an interior face and an exterior face. A first panel assembly thus is provided by connecting the exterior face of the first panel 17 to the first standoffs on the first studs 13 to define spaces between the exterior face of the first panel and the interior sides of the first studs 13. The first panel assembly may define a vertical wall, and includes the first studs 13, the first standoffs, and the first panel 17. Similarly, a second panel assembly is provided by connecting the exterior face of the second panel 57 to the second standoffs to define spaces between the exterior face of the second panel 57 and the interior sides of the second studs 53. The second panel assembly thus may define a horizontal roof, and includes the second studs 53, the second standoffs, and the second panel 57. A plurality of third studs 73 preferably was provided. A third panel 77 accordingly is provided, the third panel likewise having a first end, a second end, an interior face and an exterior face. As with the provision of the first and second panel assemblies, a third panel assembly thus is provided by connecting the exterior face of the third panel 77 to third standoffs attached on the third studs 73 to define spaces between the exterior face of the third panel 77 and the interior sides of the third studs 73. The third panel assembly may define a vertical wall, and includes the third studs 73, third standoffs, and the third panel 77.

Figure 12C:
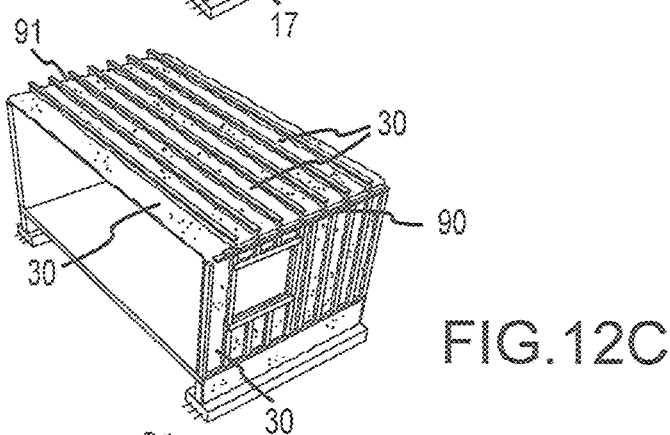

Reference to FIGS. 12B and 12C indicate generally the step of adjoining together the first two panel assemblies (i.e., panel assemblies 42, 44 of FIG. 13), of what may eventually be a plurality of panel assemblies that are positioned with ends adjacent and adjoined together. A first panel assembly (for instance, wall panel assembly including studs 13 and panel 17) and second panel assembly (for instance roof panel assembly including studs 53 and panel 57) are adjoined end to end. The adjoining may be by generally conventional means, such as by nailing or framing anchors, with/to a corner stanchion (between two wall panel assemblies) or a top plate (to join a wall panel assembly to a roof panel assembly). The step of adjoining two panels assemblies preferably includes placing the first end of a first panel 17 adjacent to the first end of a second panel 57 to define a first juncture 90, and applying continuously the layer of insulating foam 30 over the first juncture. Application of the foam layer 30 includes covering the exterior face of the first panel 17 and covering the exterior face of the second panel 57, and filling the spaces defined between the exterior face of the first panel 17 and the interior sides of the first studs 13, and filling the spaces defined between the exterior face of the second panel 57 and the interior sides of the second studs 53, and with the same continuous application also wrapping the layer of insulating foam 30 over the first end of the first panel and over the first end of the second panel to cover the first juncture 90.

By these steps a sealing envelope comprised of the foam layer 30 covers the first panel assembly and the second panel assembly. The method also preferably includes placing the first end of the third panel 77 adjacent to a second end of the second panel 57 to define a second juncture 91, as also seen in FIG. 12C. Thereafter, the step of applying continuously the layer of insulating foam 30 preferably further comprises covering with the foam layer the exterior face of the third panel 77, filling with the foam layer the spaces defined between the exterior face of the third panel 77 and the interior sides of the third studs 73, and wrapping the layer of insulating foam over the first end of the third panel 77 and over a second end of the second panel 57 to cover the second juncture 91. In this manner a sealing envelope or shell covers the first panel assembly, the second panel assembly, and the third panel assembly. This forgoing process can be successively or simultaneously repeated to juxtapose and join additional fourth, fifth, sixth or more panel assemblies (e.g. elements $42_n$, $44_n$, 46 of FIG. 13) to erect a construction unit of practically any desired layout or configuration.

Figure 12D:
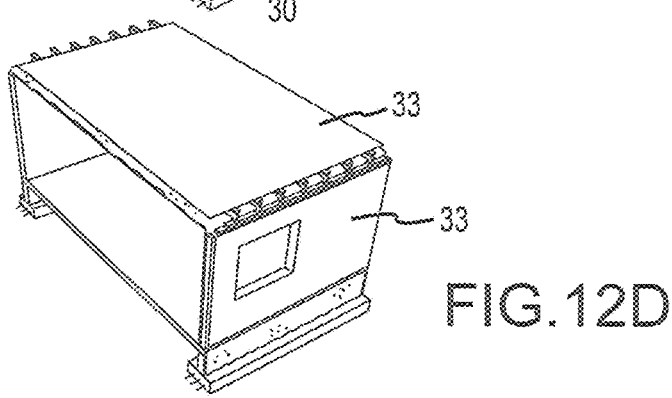

FIG. 12D illustrates that any of a variety of suitable exterior sheathings 33 may optionally then be installed, e.g., to the exterior sides of the various studs, to aesthetically cover the structure and/or provide a surface for application of exterior finish materials, such as stucco, brick façade, shingles, aluminum or vinyl siding, etc. However, the installation of exterior sheathings in the inventive method and structure is optional, and primarily for aesthetics; the sealing envelope provided by the application of the continuous foam layer 30 in the process described provides for a sealing of the space within the structure against the weather, sound, vermin, etc.

Figure 13:
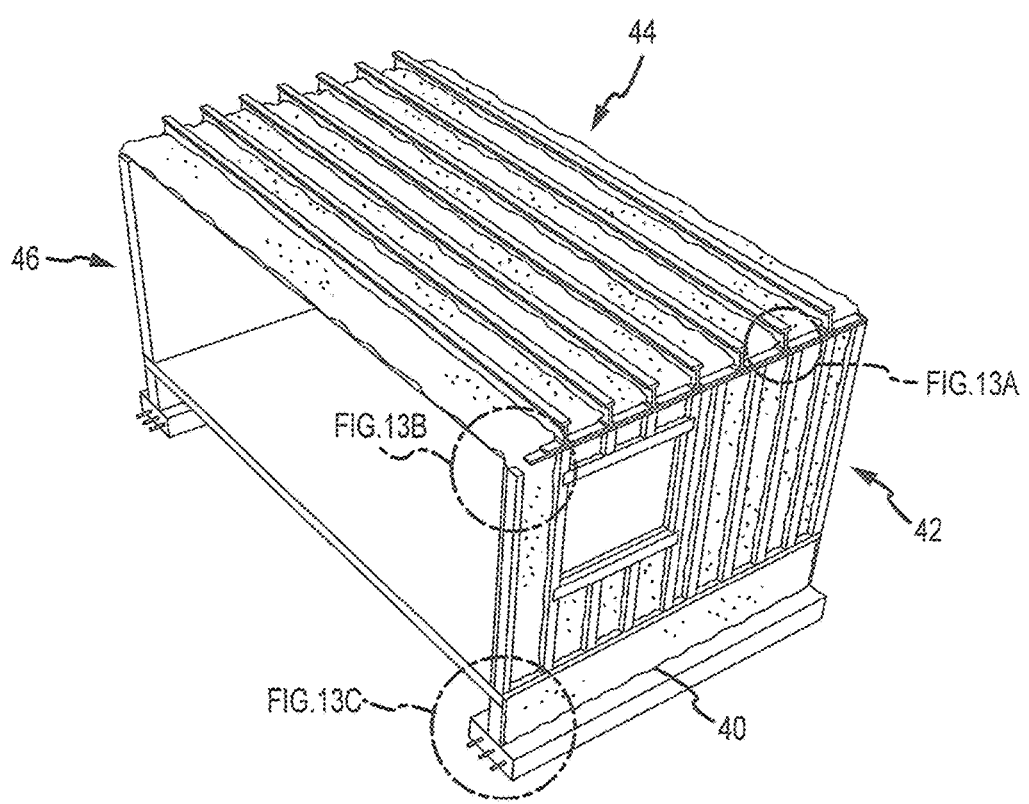
FIG. 13 is an enlarged view of the construction unit seen in FIG. 12C, showing an arrangement of three panel assemblies in a possible juxtaposition according to the present invention.

The method and system of the present disclosure is further explained by reference to FIG. 13, which is an enlarged view of the construction unit of FIG. 12C. A construction unit completed according to the basic steps of the inventive method includes a plurality of panel assemblies arranged and connected to comprise the construction unit; there are at a minimum a first panel assembly 42, a second panel assembly 44, and a third panel assembly 46 erected and configured as explained hereinabove, and as seen in FIG. 13. Fourth and fifth panel assemblies are not depicted in FIG. 13 for the sake of simplicity, but may be provided to close the sides appearing to be open in the figure. The panel assemblies 42, 44, 46 are adjoined end-to-end and situated on the foundation 40. The foam layer is visible in all three panel assemblies 42, 44, 46 on the exterior faces of the first panel 17 between the first studs 13, and on the exterior face of the second panel 57 between the second studs 53. Although not explicit in FIG. 13, it is readily understood that the foam layer also coats the exterior face of the third panel 77 between the third studs 73.

Figure 13A:
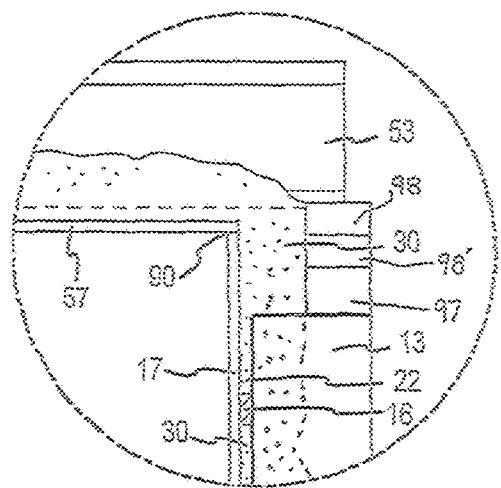
FIG. 13A is an enlarged view of a portion of the construction unit depicted in FIG. 13, the portion generally identified at "A" in FIG. 13.

Special attention is invited to FIG. 13A, an enlarged vertical sectional view of a portion, designated generally at "A" in FIG. 13, of a construction unit according to a substantially completed method of the present disclosure. FIG. 13A offers additional detail regarding advantageous features of the method and system of the invention. The FIG. 13A configuration typifies the connections between wall panel assemblies (e.g., panel assemblies 42, 46 of FIG. 13) and associated roof panel assemblies (e.g., panel assembly 44 of FIG. 13) throughout a construction unit according to the present disclosure. In a preferred embodiment explained hereafter, the provision of a top plate 97 that is atypically narrow in relation to the widths of its supporting studs 13 promotes the thorough application of a foam layer 30 over and around the juncture 90 where two panels 17, 57 abut in the circumstance of a roof panel assembly atop a wall panel assembly.

FIG. 13A shows an exemplary first stud 13, with a standoff 16 attached to its interior side. The exterior face of the first panel 17 is attached to the standoff 16 to space the panel 17 apart from, but about parallel to, the first stud 13. Spaces 22 are between the interior side of the stud 13 and the exterior face of the first panel 17. FIG. 13A also indicates a roof truss 53 resting above (but not directly upon) the top end of the first stud 13. A top plate 97 runs in a conventional manner along the top ends of the studs 13 spanning from stud to stud, as suggested by FIG. 13. The exterior face of the second panel 57 is attached to the second standoffs (not seen in FIG. 13A) to space the second panel 57 apart from, but about parallel to, the roof truss 53. A space thus also is provided between the interior side of the truss 53 and the exterior face of the second panel 57. It is understood, of course, that in a construction according to the system and method there are a plurality of spaced-apart horizontal trusses like truss 53, and a plurality of spaced-apart vertical studs like stud 13, as suggested by reference to FIG. 10 and FIGS. 12A-D.

In a method according to FIG. 13A, each truss 53 preferably is aligned with and above (but does not directly contact) a corresponding one of the studs 13. The construction features at least one saddle 98. One or two (preferably two, as seen in the drawing figure) saddles 98, 98' are disposed between each truss 53 and the top plate 97. A saddle 98 or 98' may be segments of 2-inch by 2-inch (in profile seen in the figure) wood or metal, and normally are at least four inches long (in direction parallel to the top plate 97). Each pair of saddles 98, 98' is secured (e.g., by screws) to the top plate 97 so that the saddles are vertically aligned with a corresponding truss 53 above and a corresponding stud 13 below, but with the top plate and saddles intermediate between the truss and the stud. The one or more saddles 98 serve to increase the separation distance between the top plate 97 and the bottom of the truss element 53 so to promote rapid and easy application of an insulation layer 30 on the juncture 90, which is near the space below each truss and inside the top plate.

Figure 13B:
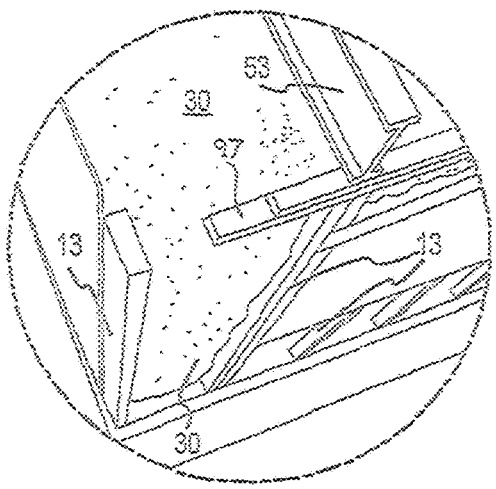
FIG. 13B is an enlarged view of a portion of the construction unit depicted in FIG. 13, the portion generally identified at "B" in FIG. 13, showing the joining of a roof panel assembly to a wall panel assembly.

Combined reference to FIGS. 13A and 13B shows that the top plate 97 is narrower in width than the width of the studs 13 beneath it. In this disclosure and claims, the "width" dimension for the top plate and studs is taken in the direction from the interior of a panel assembly toward the exterior of the assembly, i.e., the left-to-right direction in the plane of FIG. 13A.

After the saddles 98, 98' have been installed, and the trusses 53 secured upon their associated saddles 98, 98', the panels 17 and 57 (such as drywall) may be installed upon the studs 13 and the trusses 53, using standoffs 16 as described herein. The top edge of the first panel 17 is closely adjacent to and preferably abuts an edge of the second panel 57 at the first juncture 90.

Also seen in FIG. 13A is that the top plate 97 and the saddles 98, 98' are situated on the outside portion of the width of each stud 13. In the example of FIG. 13A, the saddles 98, 98' and the top plate 97 have approximately equal widths, and their widths are about one-half of the width of the top of the stud 13 to which they are attached. Because the saddles 98, 98' and the top plate 97 are narrower than the stud 13, and are attached to the outer portion of the top of the stud, there is provided a space between the inside faces of the saddles and top plate and the exterior face of the panel 17 which can be readily filled with layer of insulating foam 30.

The incorporation of the saddles 98, 98' and narrow top plate 97 thus fosters smooth and reliable application of the spray foam 30 in a continuous manner around the juncture 90 of the first and second panels 17, 57. Because the saddles 98, 98' and top plate 97 are narrower (e.g., approximately two inches) in the horizontal dimension seen in FIG. 13A than is the top of the stud 13 (e.g. four inches, the studs 13 typically being 2×4 or 2×6 studs), there is ample space between the top plate 97 and the juncture 90 to permit foam to be applied around the exterior of the juncture 90.

The foam layer 30 is then applied substantially continuously to the exterior faces of panels 17, 57, so to fill the spaces defined between the panels and the studs 13, 53. Significantly and as shown in FIGS. 13A and 13B, the foam layer 30 also wraps around the exterior of the juncture 90 where the panels abut, thereby provided a seamless seal where the panels come together. The foam layer 30 preferably fills much or all the space between the saddles 98, 98' and the panels juncture 90, and between the top plate 97 and the juncture 90, as indicated in FIG. 13A. The foam 30 is illustrated by dotted graphic in FIGS. 13A and 13B; those figures show that the foam layer 30 seals the juncture 90 with a single layer of foam that covers the exterior of the second panel 57 of the roof panel assembly, wraps over the juncture, and covers the exterior surface of the first panel 17. In FIG. 13A, the foam layer is seen to be applied "behind" the stud 13 as indicated by the dashed phantom line denoting the exterior face of the foam layer behind the stud. Combined reference to FIGS. 13, 13A-C show that the foam layer 30 preferably occupies the space between adjacent studs 13, 53; the foam layer 30 thus preferably fills the spaces between adjacent studs 13 as well as between adjacent trusses 53 as suggested for example by FIG. 10.

The use of at least one saddle 98 and a top plate 97 narrower in width than the width of the studs 13 thus provides an advantage of the present system and method. The foam layer 30 may be applied easily to seal the juncture 90 while allowing the layer of foam to be applied continuously from the juncture on down into the wall panel assembly without being obstructed or slowed by a top plate. In conventional construction wherein the top plate has a width equal to the width of the wall studs, and in the absence of any saddles (e.g., 98) there is inadequate space for application of the foam layer around the outside of the juncture 90, and the application of the foam layer 30 around the juncture and into the wall assembly is impeded or obstructed by the full-width top plate—compromising the "integral sealing shell" aspects and benefits of the present invention.

The foam layer 30 preferably is four inches thick where applied to the second panel that defines a portion of the ceiling, and is two and one-half inches thick where it is applied to the first panel in the vertical wall assembly.

Performing the foregoing at all junctures between adjoining panels provides a sealing envelope which substantially encases the exterior faces of all the panel assemblies of the construction unit to supply benefits of the invention. FIG. 13B, for example, illustrates that the foam layer 30 is seamless and continuous as it covers both a vertical first panel and a horizontal second panel as it envelopes the junction of the panels. A third panel assembly adjoining the first two seen in FIG. 13B likewise is enveloped seamlessly and continuously by the same application of the foam layer 30.

A method according to the invention thus includes: (1) erecting a panel assembly comprising a plurality of studs and at least one top plate; (2) attaching standoffs to the inside faces of the studs; (3) securing a plurality of saddles to the upper surface of the uppermost top plate, with each saddle aligned vertically with a corresponding one of the studs; (4) erecting a plurality of trusses above the panel assembly by installing trusses upon corresponding ones of the saddles; (5) attaching standoffs to the inside (lower) surfaces of the trusses; (6) connecting the exterior face of a first panel to the standoffs on the studs; (7) connecting the exterior face of a second panel to the standoffs on the trusses (8) placing a first end of the first panel directly adjacent to a first end of the second panel to define a juncture; and (7) applying continuously a layer of insulating foam, comprising covering: at least a portion of the exterior face of the first panel, between adjacent studs, and at least a portion of the exterior face of the second panel between adjacent trusses, and covering the juncture between the first and second panels.

Figure 13C:
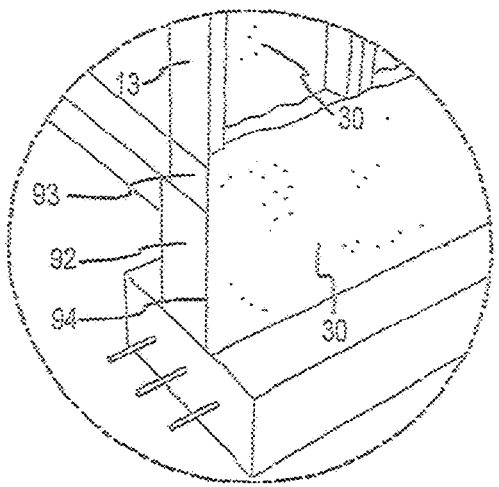
FIG. 13C is an enlarged view of a portion of the construction unit depicted in FIG. 13, the portion generally identified at "C" in FIG. 13.

The foundation 40 seen in FIG. 13 is seen in the enlarged view of FIG. 13C. In an embodiment of the invention, the foundation includes a vertical stem wall 92 having an exterior face. In this alternative embodiment, the foam layer 30 is applied substantially continuously to coat and cover not only the exterior face of a first panel on the studs 13, but also the top of a toe or sole plate 93 and the face 94 of the stem wall as well, thereby to seal and encapsulate the connection between the first panel assembly (e.g., panel assembly 42) and the foundation of the construction unit structure.

Structural Analyses

A confidential structural analysis was performed to evaluate the structural integrity of a wall assembly according to the present invention. As disclosed herein the wall assembly includes the use of stand-offs on the wall studs, permitting an application of additional structural foam equal to the thickness of the stand-offs. Secondary objectives of the analysis included acoustic and thermal analysis to understand the sound attenuation and thermal barrier, respectively, provided by the wall assembly.

Additional advantages of the complete assembly, as described by the requestor, include air tightness of the assembly by foam encapsulation. An analysis of a complete enclosure according to the invention was outside of the scope of the structural analysis project. However, in some cases, the structural analysis was performed using boundary conditions on the vertical end studs which are like those that would be present in a four-wall room configuration.

With an objective of evaluating the structural integrity, or "strength," of a wall assembly, it was decided to develop high-fidelity structural models of the wall assembly for: (a) the configuration with stud stand-offs and structural foam according to the present invention, and then (b) to compare the findings to a conventional construction with foam, but with no stand-offs. The variable in these configurations is the thickness of the wall-in foam, as the standoffs permit additional foaming.

The report "Full-Scale Tensile and Shear Wall Performance Testing of Light-Frame Wall Assemblies Sheathed with Windstorm OSB Panels," prepared by NAHB Research Center, Inc., Jul. 8, 2005, Report Number P05-474070805, describes typical test evaluations that are done in the industry to evaluate wall assemblies. The described "racking tests" (wall shear) and tension tests are used to evaluate wall assemblies. These test cases, and others, were chosen to evaluate the wall assembly.

The "Shear Wall" configuration of the NAHB Research Center report was selected for the truss geometry of the model. The configuration included seven vertical trusses, each with length 92⅝ inches long, and spaced 16 inches on center. With the addition of a top and bottom plate truss, the total height of the assembly was 95⅝ inches. The inclusion of a second top plate truss was not deemed necessary for inclusion in the analysis, thus it was not included to simplify the model. The analysis was performed for three cases described as Cases 1, 2, and 3:

Case 1: With Stand-offs, 2" depth of foam
Case 2: No Stand-offs, 2" depth of foam
Case 3: With Stand-offs, 2.5" depth of foam The truss geometry described above was the same for all three cases. Case 1 and Case 2 can be compared to understand the effect of the stand-offs for the same amount of foaming. (Here, the materials cost of the foam application would be the same.) However, due to the stand-offs, only 1.5-inch depth of foam was adhered to the interior surface of the studs due to the 0.5-inch offset of the stand-offs, while all 2-inch depth of foam in Case 2 was adhered to the interior surface of the studs. Thereafter, Case 3 was also analyzed such that Cases 2 and 3 both had 2-inch foam depth adhered to the interior surfaces of the studs, which required more material cost of foam for Case 3, while leaving the same amount of non-foamed working space for electrical wiring, etc.

The truss model geometry was substantially as depicted in FIGS. 7 and 8. For Cases 1 and 3, the shear wall truss geometry included stand-offs located with 12-inch spacing on center starting at the bottom truss plate with dimensions of 1.5 inch by 1.5 inch by 0.5 inch (width, height, depth) (e.g., FIGS. 5 and 6). The stand-off spacing near the top was less than 12 inches. Inclusion of the structural foam was substantially as shown in FIG. 8. For test Case 2, the wall assembly configuration and foam application were essentially the same as for Cases 1 and 3, except that no standoffs were used. Three-eighths inch gypsum board was modeled on the interior wall and was adhered to the stand-offs and foam in Cases 1 and 3, and adhered to the trusses and foam in Case 2.

Material properties were determined for the trusses, stand-offs, foam, and gypsum from online material databases. A spruce-pine lumber with 12% moisture was selected for the truss and stand-off material. A 2.0 lb/ft³ density was assumed for the foam with associated properties. Material properties for gypsum were used for the drywall material.

The two load-type evaluations performed in the NAHB Research Center report were simulated using analysis. These included the shear wall "racking test," as well as a compressive loading. It was not deemed suitable to perform a tension loading simulation, as the wall assembly normally will be loaded in compression in actual use according to the invention. In addition to the shear and compression loadings, a load was also applied to evaluate the structural integrity under twisting, as well as a load approximating the effect of a wind load perpendicular to the wall surface.

The approach of the analysis was to apply the same loads to the models corresponding to Cases 1, 2, and 3, then evaluate and compare the resulting deformations and stresses. As such, the only variable from case to case is the geometry of the wall assembly.

Figure 14:
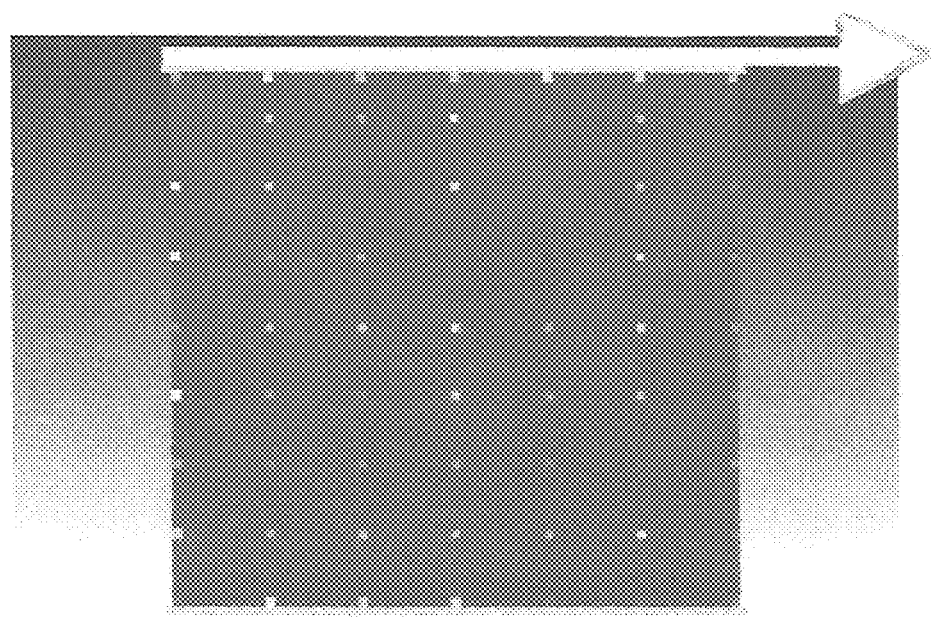
FIG. 14 is a graphical depiction of a panel assembly, showing with a directional arrow the direction of a racking test load conducted in a modelled test of the assembly.
Figure 15:
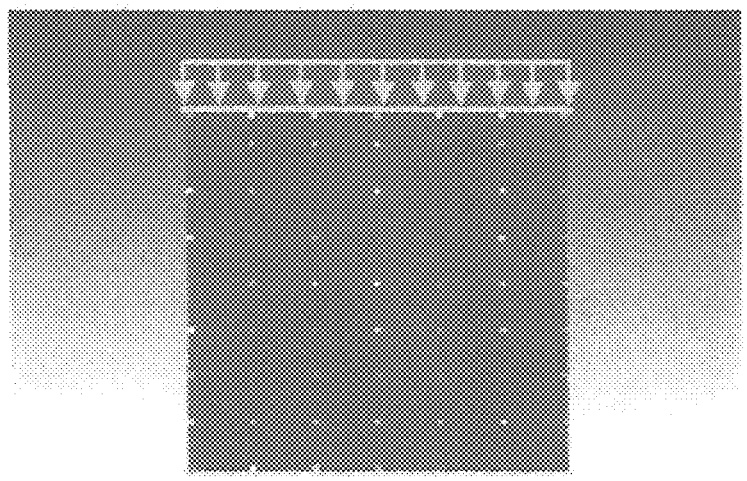
FIG. 15 is a graphical depiction of a panel assembly, with directional arrows showing a distributed load applied to the top plate, for a compression load conducted in a modelled test of the assembly.
Figure 16:
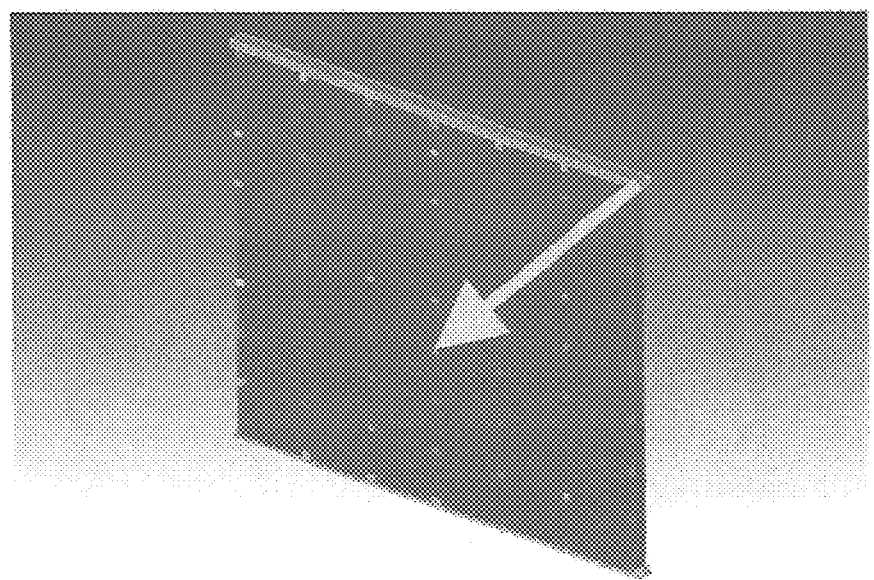
FIG. 16 is a graphical depiction of a panel assembly, with a directional arrow showing a load applied to an upper corner of the assembly, for a point load conducted in a modelled test of the assembly.

A racking test, a compression test, a twist loading test, and a wind loading test were all modelled. Racking Test: A distributed load was applied along the entire top surface of the top plate truss as shown in FIG. 14 to simulate the racking test (per the NAHB Research Center report). Compression: A distributed load was applied to the top plate truss as shown in FIG. 15. Twist Load: A point load was applied to the upper right corner of the assembly of the interior wall, as shown in FIG. 16. Wind Load: A uniform pressure was applied over the entire surface of the drywall, generally perpendicular thereto.

Results were generated from the foregoing testing. The results included calculation of the structural deformation or displacement, in units of inches, and the stresses with units of psi due to the previously described loads. For all analysis, the bottom plate truss was assumed to be rigidly fixed in place at all points along its bottom surface. This clamped condition approximates a bolted bottom plate truss.

Shear Wall Results:

A traction of 100 psi was applied to the top surface of the top plate as shown in FIG. 14. This case simulates the racking test. The top plate was constrained to move only in the direction of the applied load. The results are listed in Table 1.

TABLE 1

Summary of Shear Wall Results

|  | Displacement (in.) | Maximum Stress (psi) | Stress in Truss (psi) | Stress in Standoff (psi) |
|---|---|---|---|---|
| Case 1 | 1.074 | 10,120 | 4,756 | 10,012 |
| Case 2 | 1.005 | 12,540 | 4,075 | n/a |
| Case 3 | 1.061 | 9,715 | 4,348 | 9,715 |

Displacement refers to the maximum motion in the direction of the applied load. Maximum Stress refers to the largest stress in the wall assembly, and are not necessarily at the same locations for the three cases. Stress in Truss refers to the stress in the fourth or center vertical stud at the connection to the top plate. Stress in Stand-off refers to the stress in the stand-off located at the center vertical stud/top plate connection.

The results demonstrate that the configuration with stand-offs permitted greater displacements; however, the maximum stress in the body was less for both configurations with stand-offs. For Cases 1 and 3, the maximum stress occurred in the stand-offs, while the maximum stress for Case 2 occurred at the connection of the first (left-most) vertical stud/bottom plate connection. These results indicate both potential improvements and reductions in structural integrity.

Compression Wall Results:

A downward pressure of 100 psi was applied to the top surface of the top plate at shown in FIG. 15. Constraints were placed on the two vertical exterior studs so that motion was only allowed on these surfaces in the direction of the applied load. These constraints are intended to "simulate" the effect of additional wall assemblies (e.g. a four-wall assembly). The results are listed in Table 2.

TABLE 2

Summary of Compression Wall Results

|  | Vertical Displacement (in.) | Maximum Stress (psi) |
|---|---|---|
| Case 1 | 0.123 | 3,353 |
| Case 2 | 0.122 | 3,431 |
| Case 3 | 0.121 | 2,905 |

These results indicate that the use of stand-offs provide no significant improvement or reduction in resistance to vertical loads.

Twist Wall Results:

A point load of 100 pounds force was applied to the top corner of the assembly as shown in FIG. 16 to evaluate the resistance of the wall to twisting loads. The results are listed in Table 3.

TABLE 3

Summary of Twist Wall Results

|  | Maximum Displacement (in.) |
|---|---|
| Case 1 | 0.948 |
| Case 2 | 1.085 |
| Case 3 | 0.920 |

These results demonstrate that the configurations with stand-offs provide modest improvement in resistance to loads that cause twisting.

Wind Load/Pressure Wall Results:

A uniform pressure of 1.0 psi was applied to the interior surface of the assembly, that is, to the drywall element. The results are tabulated in Table 4.

TABLE 4

Summary of Pressure Wall Results

|  | Maximum Displacement (in.) |
|---|---|
| Case 1 | 1.027 |
| Case 2 | 1.200 |
| Case 3 | 0.989 |

Figure 17:
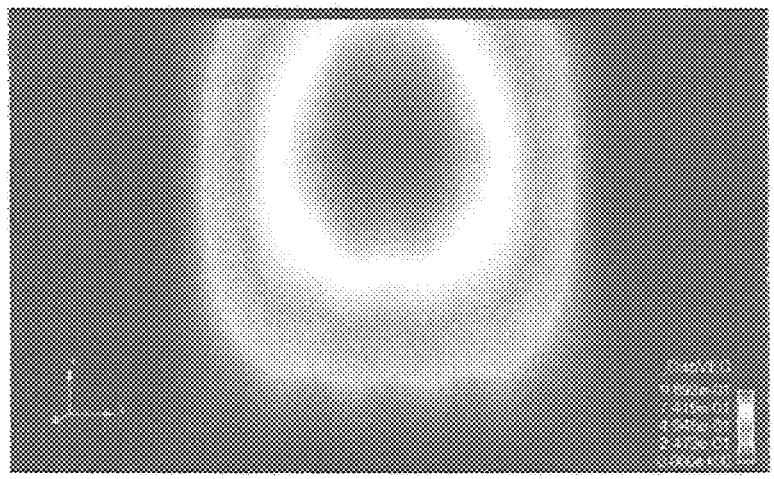
FIG. 17 is a graphic display of deformation (to the 1.0 psi) pressure in a modelled loading of the wall assembly.

A plot of the deformed wall for Case 3 is shown in FIG. 17. The largest displacement corresponds to the darkest area at the center of the ringed image, and the smallest displacement corresponds to the darkened area outside the outer thin light ring.

The results in Table 4 indicate that the use of stand-offs reduces the size of the deformation of the wall assembly due to distributed pressure loads.

The results of the analysis indicated that in some cases, moderate improvements in stiffness and reductions in stresses are found with the use of stand-offs. While the analyses did not represent an exhaustive evaluation as the response of a complete assembly of a four-wall structure with ceiling, improvements in stiffness in a wall assembly according to the invention were noted.

Whereas the figures and description have illustrated and described the concept and preferred embodiment of the present invention, it should be apparent to those skilled in the art that various changes may be made in the form of the invention without affecting the scope thereof. The detailed description above is not intended to limit the broad features or principles of the invention, or the scope of patent monopoly to be granted. Thus, although the invention has been described in detail with particular reference to these preferred embodiments, other embodiments can achieve the same results. Variations and modifications of the present invention will be obvious to those skilled in the art and it is intended to cover in the appended claims all such modifications and equivalents.

What is claimed is:

1. A method for erecting a construction unit, comprising:
   providing first studs, the first studs each having an interior side, an exterior side, a stud top end, and a stud width dimension between the interior side and the exterior side;
   attaching first standoffs to the interior side of each of the first studs;
   providing a first panel, the first panel having a first end, a second end, an interior face and an exterior face;

providing roof trusses, the roof trusses each having an interior side and an exterior side;
attaching second standoffs to the interior side of each of the roof trusses;
providing a second panel, the second panel having a first end, a top end, an interior face and an exterior face;
providing a first wall by assembling a first panel assembly by connecting the exterior face of the first panel to the first standoffs to define spaces between the exterior face of the first panel and the interior sides of the first studs;
providing a roof by assembling a second panel assembly by connecting the exterior face of the second panel to the second standoffs to define spaces between the exterior face of the second panel and the interior sides of the roof trusses;
placing the first end of the first panel directly adjacent to the first end of the second panel to define a first juncture; and
applying continuously a layer of insulating foam, comprising:
covering the exterior face of the first panel and covering the exterior face of the second panel;
filling the spaces defined between the exterior face of the first panel and the interior sides of the first studs, and filling the spaces defined between the exterior face of the second panel and the interior sides of the roof trusses; and
wrapping the layer of insulating foam over the first end of the first panel and over the first end of the second panel to cover the first juncture to join the first panel directly to the second panel.

2. The method of claim 1 further comprising:
situating a top plate horizontally along the stud top ends of the first studs of the wall assembly, the top plate having a top plate width dimension less than the stud width dimension; and
disposing a saddle between each roof truss and the top plate.

3. The method of claim 2 wherein the step of disposing a saddle comprises disposing at least two saddles, one on top of the other.

4. The method of claim 2 wherein the step of disposing a saddle comprises disposing a saddle having a saddle width less than the stud width dimension.

5. The method of claim 2 further comprising locating the top plate on outer portions of the stud top ends to provide a space between the top plate and the exterior face of the first panel, wherein the step of wrapping the layer of insulating foam comprises disposing the layer of foam into the space between the top plate and the exterior face of the first panel.

6. The method of claim 5 wherein the step of disposing a saddle between each truss and the top plate comprises disposing upon the top plate a saddle having a saddle width less than the stud width dimension, wherein the step of wrapping the layer of insulating foam further comprises disposing the layer of foam into a space between the saddle and the exterior face of the first panel.

7. A method for erecting a construction unit, comprising:
providing first studs, the first studs each having an interior side, an exterior side, a stud top end, and a stud width dimension between the interior side and the exterior side;
providing a first panel, the first panel having a first end, a second end, an interior face and an exterior face;
attaching first standoffs to the exterior face of the first panel;
providing roof trusses, the roof trusses each having an interior side and an exterior side;
providing a second panel, the second panel having a first end, a top end, an interior face and an exterior face;
attaching second standoffs to the exterior face of the second panel;
providing a first wall by assembling a first panel assembly by connecting the interior sides of the first studs to the first standoffs to define spaces between the exterior face of the first panel and the interior sides of the first studs;
providing a roof by assembling a second panel assembly by connecting the interior sides of the roof trusses to the second standoffs to define spaces between the exterior face of the second panel and the interior sides of the roof trusses;
placing the first end of the first panel directly adjacent to the first end of the second panel to define a first juncture; and
applying continuously a layer of insulating foam, comprising:
covering the exterior face of the first panel and covering the exterior face of the second panel;
filling the spaces defined between the exterior face of the first panel and the interior sides of the first studs, and filling the spaces defined between the exterior face of the second panel and the interior sides of the roof trusses; and
wrapping the layer of insulating foam over the first end of the first panel and over the first end of the second panel to cover the first juncture to join the first panel directly to the second panel;
whereby a sealing envelope of foam coats the first panel assembly and the second panel assembly to define a foam shell sealing the juncture.

8. The method of claim 7 further comprising:
situating a top plate horizontally along the stud top ends of the first studs of the wall assembly, the top plate having a top plate width dimension less than the stud width dimension; and
locating the top plate on outer portions of the stud top ends to provide a space between the top plate and the exterior face of the first panel, wherein the step of wrapping the layer of insulating foam comprises disposing the layer of foam into the space between the top plate and the exterior face of the first panel.

9. The method of claim 8 further comprising disposing a saddle between each roof truss and the top plate.

10. The method of claim 9 wherein the step of disposing a saddle comprises disposing at least two saddles, one on top of the other.

11. The method of claim 9 wherein the step of disposing a saddle comprises disposing a saddle having a saddle width less than the stud width dimension.

12. The method of claim 11 wherein the step of disposing a saddle between each truss and the top plate comprises disposing upon the top plate a saddle having a saddle width less than the stud width dimension, wherein the step of wrapping the layer of insulating foam further comprises disposing the layer of foam into a space between the saddle and the exterior face of the first panel.

* * * * *